March 22, 1932.    A. J. O'BRIEN    1,850,847
PNEUMATIC HONE
Filed Sept. 19, 1928
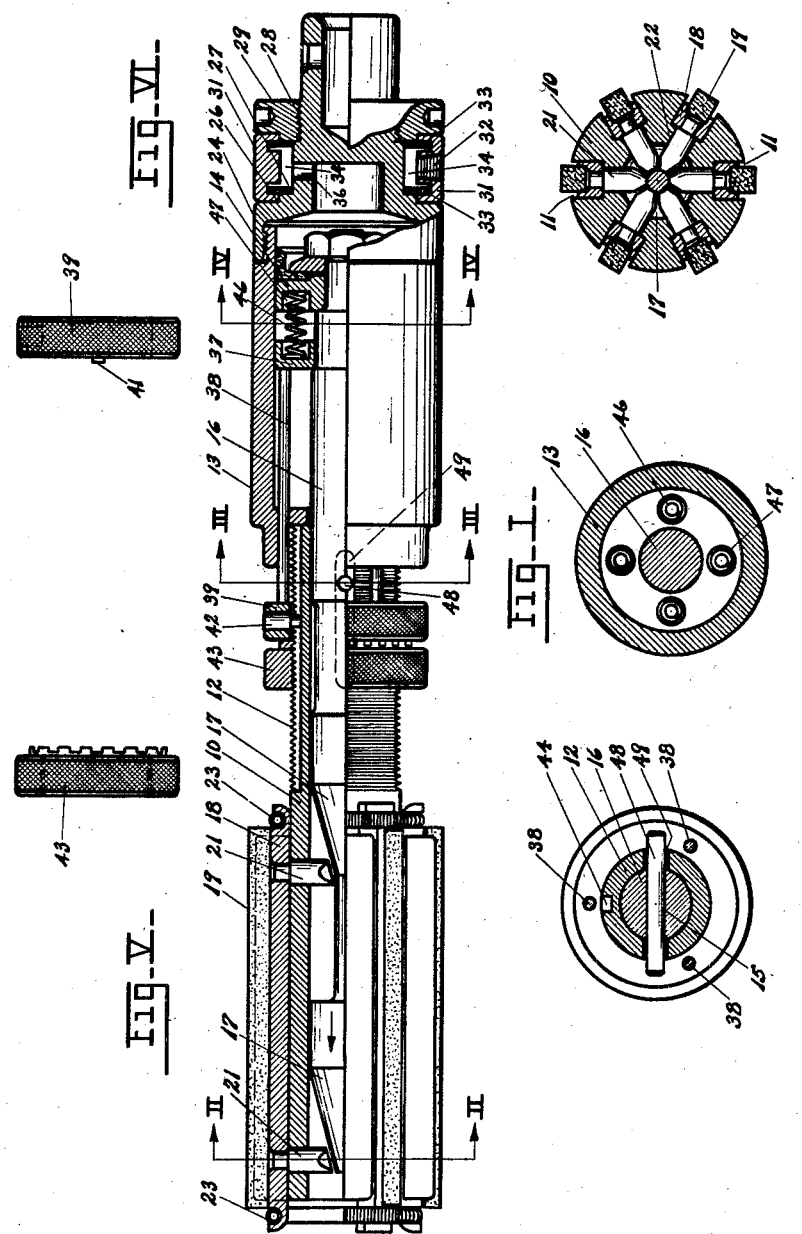
INVENTOR.
ARTHUR J. O'BRIEN
BY Warren T. Hunt
ATTORNEY.

Patented Mar. 22, 1932

1,850,847

UNITED STATES PATENT OFFICE

ARTHUR JOSEPH O'BRIEN, OF PONTIAC, MICHIGAN, ASSIGNOR TO THE WILLYS-OVERLAND COMPANY, OF TOLEDO, OHIO, A CORPORATION OF OHIO

PNEUMATIC HONE

Application filed September 19, 1928. Serial No. 306,889.

My invention relates to hones and it has particular application to devices of the aforementioned class which are employed in machining cylindrical surfaces, such as cylinder castings and the like.

One object of the invention is to provide a hone which may be operated at greater speeds than has been possible heretofore, and at the same time, which is capable of producing a product in which the honed surfaces are free from taper and are made more truly round than those produced by present day methods and machines.

It is a further object of the invention to provide a structure which is free from influences that tend to break the abrasive sticks, resulting in loss to the operator of material as well as time.

It is a further object of the invention to provide a pneumatically operated structure of the class herein before designated, and an adaptable hone shoe actuating mechanism therefor which can be actuated the same distance and retracted with the same force irrespective of the position of adjustment.

These, together with other objects, will become more apparent from a consideration of the drawings and description of an embodiment of the invention which may be preferred.

Figure I is a plan view, partly in section, of an abrasive holder, together with a mechanism for expanding the same.

Fig. II is a view, partly in section, taken substantially along the line II—II in Figure I.

Fig. III is a view, likewise partly in section, taken substantially along the line III—III in Figure I.

Fig. IV is a sectional view taken along the line IV—IV in Figure I.

Figs. V and VI are side views of a castellated nut and the engaging collar respectively.

The hone reciprocating and rotating mechanism is neither illustrated nor described, since any conventional mechanism for performing this function may be adopted. Moreover, it is not essential to the full understanding of the present invention.

The device herein, includes a cylindrical frame or quill 10 of a uniform bore, the outer surface of a portion of which is provided with a plurality of grooves 11, the remaining portion being of reduced dimension and having a threaded surface 12. The extremity of the threaded surface is adapted to screw into a cylinder 13 in which there is disposed a fluid actuated piston 14. The piston unit includes a shaft 16 having an aperture 15 and cone-shaped surfaces 17, the unit being slidably disposed within the hollow grooved frame member.

Within each of the grooves a shoe 18 is slidably disposed, which is adapted to retain an abrasive stick 19 and which has formed integrally therewith a pair of lugs 21 that project through apertures 22, formed in the base of the grooves 11, and engage the cone-shaped surfaces 17, of the connecting rod. Coil springs 23 at both ends of the shoes function to carry the shoes back into a receded position in the base of the grooves 11.

The extremity of the cylinder 13 is threaded and forms a fluid tight seal with a cylinder cap 24 that is secured thereto. The cap 24 is provided with two annular shoulders 26 and 27, as well as an externally threaded portion 28. A shouldered collar 29 is screwed on the threaded portion 28 of the cap into cooperative position with the shoulders 26 and 27 formed on the cylinder cap to accommodate a ring 31 which is rotatable with respect to the engaging surfaces of the cylinder cap and the collar. A tapped opening 32 is formed in the ring for the air connection, a fluid seal being maintained between the relatively moving parts by means of a pair of leather washers 33. Air is communicated to the piston chamber through the tapped opening 32 and by way of an annular passage 34, between the ring 31 and the cap 24, and into the piston chamber through a hole 36 in the cap. The entire unit may be supported and actuated in the conventional manner.

A recessed abutment collar 37 is disposed within the cylinder 13. On its outer surface the collar slidably engages the cylinder wall and on its inner surface it slidably engages a shoulder provided therefor on the shaft 16.

One end of each of three pins 38 abuts the collar 37. The pins project through openings in the base of the cylinder; and the opposite ends thereof abut a ring or locking collar 39 slidably disposed about the threaded surface 12 and having a lateral lug 41, as well as a pin 42. The lug engages a castellated nut 43, which screws on the threaded surface portion of the frame. The lateral lug 41 of the ring is positioned to mesh with the castellated portion of the nut 43, whereas the pin 42 is slidably disposed in a groove 44 that extends the full length of the threaded portion of the frame.

The four springs 46, which are lodged within recesses 47 in the collar tend to oppose the hone expanding movement of the piston and function to return the piston, as well as the shaft 16 to its normal position after the honing operation. Although the spring resists the movement of the piston to some extent, the air pressure employed is sufficient to overcome this resistance.

A pin 48 is pressed into the aperture 15 and projects on either side through slots 49 in the quill 10 engaging the ring 39. The ring 39 defines the limit of travel of the piston and shaft since it serves as a positive stop to movement of the pin 48 which is rigid therewith and the distance between the pin 48 and the ring 39 is a measure of the extent of travel of the piston.

In order to change the position of the pin 38 and thereby vary the extent of axial movement of the piston and radial movement of the sticks 19, ring 39 is drawn against the resistance of coil springs 46 until the lug 41 escapes the mating castellations which is usually less than the frictional resistance of the piston 14, after which the nut 43 is rotated the necessary amount to produce the required adjustment. The position of the nut is thereafter made secure by permitting the lug to slide into engagement with the castellated nut, after which no further rotary movement is possible.

To operate the device, the hone is mounted in a suitable mechanism for imparting the desired rotary and reciprocatory motions and subsequently is positioned within a cylinder. Air is thereafter introduced into the piston chamber which actuates the piston and shaft 16 in the direction indicated by the arrow and causes the abrasive sticks to move radially outward. When the honing operation is completed the pin 48 will have engaged the previously positioned abutment ring 39, after which no further honing action is possible. The air in the cylinder is thereupon released and the four springs 46 within the cylinder will thereafter slide the shaft 16 to its released position, carrying with it the pin 48. The coil springs 46, disposed at the extremities of the shoes 37 return the hone members to the position illustrated.

I have found that in honing cylinder blocks by means of the pneumatically operated hone expanding mechanism hereinabove described the difficulties, which result in large breakage of abrasive sticks, are eliminated. Furthermore, the compressed air having cushioning properties when contrasted with the complicated mechanical elements employed heretofore to produce the expanding action, not only facilitates production but reduces the breakage to a minimum. It is to be noted that regardless of the position of the adjustment ring 39, the springs 46 function in the same manner and the force with which they tend to return the piston to its released position is substantially the same.

By means of these improvements I have been able to produce a more uniform product in less time as well as one in which no taper or out-of-round condition is manifested.

Although there is illustrated and described but a single embodiment of my invention, it will be apparent to those skilled in the art that the invention is not restricted to the embodiment herein described, but may be extended to other embodiments without departing from its principles and I desire, therefore, that it be limited only as indicated in the appended claims.

I claim:

1. A hone including a fluid operated piston, an adjustable stop for said piston, a plurality of honing sticks, means for supporting the sticks, and means co-operative with the supporting means and the piston adapted to actuate the sticks.

2. A hone including a fluid operated piston, a plurality of honing sticks, individual shoes for each of the sticks, and means co-operative with the piston and the shoes for actuating the sticks.

3. A hone including a fluid operated piston, an adjustable abutment for limiting the operation of the piston, resilient means for returning the piston to its normally released position, said abutment forming a stop for limiting the bodily movement of the resilient means, a plurality of honing means co-operative with the piston and movable radially with respect thereto and means actuated by the piston for expanding the honing means.

4. A hone including a fluid operated piston, resilient means for returning the piston to its inoperative position, an abutment for limiting the movement of the piston, said abutment being adjustable axially of the piston, a plurality of honing means movable radially of the piston, resilient means for restraining their outward movement, and means actuated by the piston for expanding the honing means radially of the piston.

5. In a hone including a fluid operated piston and a plurality of shoes having abrasive sticks adapted to be expanded radially by the piston, means for controlling the operation of the piston comprising an adjustable abutment for limiting the extent of the movement of the piston, and resilient means for returning the piston to its normal position, said resilient means being adapted to be moved bodily in accordance with the movement of the adjustable abutment.

6. In a hone including a fluid operated piston and a plurality of shoes having abrasive sticks adapted to be expanded radially by the piston, means for controlling the operation of the piston comprising an adjustable abutment for limiting the extent of movement of the piston, and resilient means engageable with the piston and adjustable with the abutment for returning the piston to its normal position.

7. In a honing device a frame member provided with a cylinder, a fluid operated piston, and a hone expanding means operated by said piston, means for limiting the movement of the piston comprising an adjustable locking member adapted to be engaged by the piston, and means supported by the locking member for returning the piston to its normal position.

8. In a honing device including a frame member provided with a cylinder, a fluid operated piston and a hone expanding mechanism operated by the piston, means for limiting the movement of the piston, comprising a threaded member adjustable axially of the cylinder, locking means for maintaining the threaded member in position co-operative with the threaded member and adapted to be abutted by the piston to limit the expanding movement of the piston, and a spring member adjustably supported by the threaded member and adapted to return the piston to its normal position.

9. In a honing device a grooved frame member having an external threaded surface portion formed in the frame, a cylinder, a fluid operated piston, a shaft integral with the piston, a hone expanding mechanism operated by the piston, and means for limiting the movement of the piston comprising a castellated nut adapted to mesh with the threaded surface formed on the frame, a ring having integral lugs formed thereon one of which is slidable in the groove and the other engageable with the castellated nut, a pin rigid with the shaft adapted to abut the ring, and a spring disposed between the piston and the ring adapted to maintain the ring lugs in mesh with the castellations on the nut and to return the piston to its normal position.

10. A honing device comprising a frame member having a threaded surface portion, a cylinder having a fluid operated piston therein, a shaft secured to said piston, a plurality of abrasive supporting means, a cone actuated by the shaft for expanding the supporting means, a castellated nut adapted to mesh with a threaded surface formed on the frame, said cylinder having a groove formed thereon, a collar member engageable with the nut having an integral lug portion slidable in the groove, resilient means adjustably supported for returning the piston to its normal inoperative position and means engageable with the collar for limiting the movement of the piston.

11. A fluid operated hone comprising a frame having an external threaded portion, a cylinder having a fluid operated piston therein, a plurality of parallel abrasive sticks, means slidable in the frame for supporting the sticks, a conic member actuated by the piston adapted to expand the supporting means radially of the cylinder, means adapted to mesh with a threaded surface formed on the frame co-axially of the cylinder for limiting the movement of the piston, and a spring member supported by the limiting means adapted to return the piston to its normal position.

In testimony whereof I affix my signature.

ARTHUR JOSEPH O'BRIEN.